Patented Aug. 8, 1944

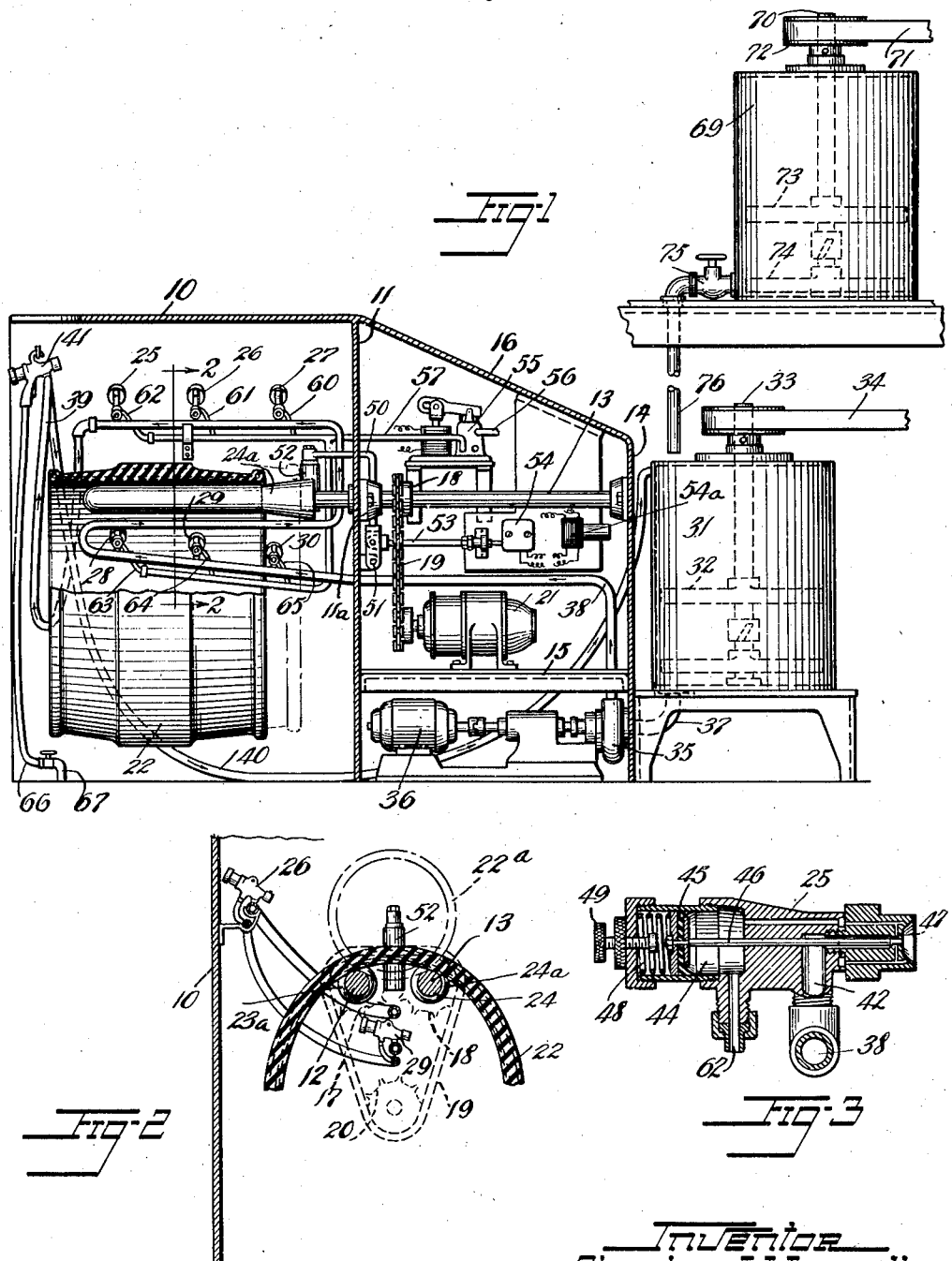

2,355,382

UNITED STATES PATENT OFFICE 2,355,382

APPARATUS FOR COATING TIRE ARTICLES

Charles W. Leguillon, Akron, Ohio, assignor to The B. F. Goodrich Company, New York, N. Y., a corporation of New York Application May 5, 1942, Serial No. 441,784

7 Claims. (Cl. 91—45)

This invention relates to a method and apparatus for coating tire articles, and is especially useful in the application of coatings of soapstone or similar materials.

In the manufacture of tire articles such as tire bands it has been found necessary to coat the unvulcanized article with powdered soapstone, mica, or other non-adhesive to prevent it from sticking to the mold and the pressure bag during the vulcanizing operation. It has been the practice heretofore to dust the unvulcanized article with powdered material but inasmuch as it has not been possible to confine the powder totally such procedure has resulted in great waste of the dusting powder and has had the objection of spreading in the air and upon walls, floors and objects.

It is desirable to apply the soapstone or other dust suspended in water or other liquid but due to the large particle size and high specific gravity of the material it has been found difficult to maintain in suspension and storing, piping and spraying facilities have become caked and clogged, requiring extensive maintenance. It is desirable to dry the articles thoroughly before subjecting them to vulcanizing heat, which renders it undesirable to wet the article excessively so as to necessitate elaborate drying operations.

The principal objects of the invention are to provide effectively for coating articles by use of a thick suspension of coating material, to avoid clogging of pipes, spray nozzles and other parts of the system, to reduce the cost of drying the coatings, to reduce the consumption of powder needed for satisfactory lubrication of the articles, to provide for cleanliness of surroundings, to provide an automatic or nearly automatic coating operation, and to provide for an improved character of the coating.

These and other objects will appear from the following description and the accompanying drawing.

Of the drawing,

Fig. 1 is a vertical sectional view of apparatus constructed in accordance with and embodying the invention, with a tire band suspended therein in the position it assumes when first placed in the coating cabinet, the final position of the band being indicated by broken lines, part of the band being broken away and part shown in section, and parts of the apparatus being broken away.

Fig. 2 is a sectional view taken along line 2—2 of Fig. 1 showing in full lines and in section a relatively large tire band, the position assumed by a small tire band being indicated by broken lines, and parts being broken away.

Fig. 3 is a sectional view of one of the spray guns taken along line 3—3 of Fig. 1.

In accordance with the invention, a thick aqueous dispersion of the coating material is prepared and continuously agitated and circulated throughout the system, including preferably even the storage tanks and applying nozzles. The article to be coated may be rotated before a hand spray gun, or before a bank of spray guns supplied with the dispersion, the spray from which is initiated by the positioning of the article in the apparatus and is controlled as to time by automatically operated timing mechanism.

Referring to the drawing, the numeral 10 designates a cabinet having an open side, the back wall 11 of which is provided with bearings 11a for a pair of parallel horizontal shafts 12, 13 extending therethrough. The shafts also have support in a wall 14 therebeyond, walls 11 and 14 comprising parts of a frame for supporting mechanism. For this purpose they are connected by frame members 15 and 16. Shafts 12, 13 have sprockets 17, 18 fixed thereto respectively and are adapted to be driven by a chain 19 from a sprocket 20 fixed to the shaft of an electric motor 21 mounted on frame member 15.

For supporting an annular tire article 22 the shafts 12, 13 have elongated spindles 23, 24 fixed thereto and these spindles have conical enlargements 23a, 24a at their inboard extremities for positioning the tire article by urging the article toward the wall 11 in its rotative movement, the conical enlargements tending to cause that margin of a band article contacting therewith to be advanced at a greater surface speed and thereby angularly changing its axis of rotation to a position causing it to creep toward the wall 11 for a purpose hereinafter mentioned.

Mounted in the cabinet 10 in a position to be available for coating the outer surface of the annular article are a plurality of pressure spray guns 25, 26, 27, directed toward the article, and a set of similar spray guns 28, 29, 30 are mounted in positions to coat the inside of the band, the spray guns being supported by their supply pipes.

As the invention contemplates the use of a dispersion having a low percentage of liquid and a high percentage of pigment, and the pigments which may be soapstone, mica or other powdery substance suitable for lubricating the tire article are of a nature such as to tend to settle out, the invention provides means for agitating and circulating the dispersion continuously throughout the system. For this purpose a storage tank 31 is provided near the spray guns, and an agitator 32 is rotatably mounted therein on a shaft 33. A pulley fixed to shaft 33 is adapted to be driven continuously by a belt 34 from any convenient source of power. A rotary pump 35 directly and continuously driven by an electric motor 36 is mounted on the frame of the cabinet and is supplied from the tank 31 by a pipe 37. A circulating pipe 38 extends from the pump and passes in turn the spray guns 30, 29, 28, 27, 26, and 25 and then by way of a flexible hose 39 and a hose 40 back to the tank 31.

For spraying any spots of the tire band not covered by the fixed spray guns and for spraying the inside of small annular articles, a movable spray gun 41 is provided and is mounted between the hose 39 and the hose 40 in communication therewith so that it may be used at any place within the cabinet, the gun 41, also, being in the path of continuous flow of the dispersion.

Each of the spray guns may be of the construction shown in Fig. 3 where the spray gun 25 is formed with a liquid supply chamber 42 close to the nozzle and directly communicating with the circulating supply line 38. Air is supplied at 62 by way of a cylinder 44 having a movable piston 45 therein. A valve rod 46 is attached to the piston and normally closes a valve seat 47. When pressure fluid is admitted to cylinder 44, piston 45 is advanced in a direction to withdraw the valve rod 46 from valve seat 47 against the resistance of a coil spring 48. Thumb screw 49 limits the lift of the valve from its seat. The arrangement is such that in the absence of high pressure in cylinder 44 escape of liquid from pipe 38 by way of the spray gun is shut off at valve seat 47 preventing waste of liquid when no spraying is being done, and when a superior pressure exists in cylinder 44 the valve is opened and at the same time the liquid is sprayed by air escaping from cylinder 44 to the spray head.

For controlling the air supply to the spray guns, a lever 50 is pivotally mounted at 51 on the partition 11 and has a roller 52 on its free end normally positioned in the path of the annular tire article between the spindles 23, 24. A rod 53 is pivotally connected to lever 50 in position to engage a limit switch 54 controlling operation of an electrical timing device 54a which in turn controls a solenoid operated valve 55 controlling supply of air to the spray guns. The arrangement is such that when roller 52 is deflected to the right in Fig. 1 limit switch 54 is closed starting timer 54a. Timer 54a thereupon energizes the solenoid of valve 55 to supply air under pressure from a convenient source, such as the pipe 56, through a pipe 57 to the spray guns. After the timer starts operating, valve 55 is held open for a period for which the timer is set whereupon the valve is automatically closed and spraying stops. The conical spindle portions 23a, 24a are of use in causing the tire band to creep to the right in Fig. 1 to actuate limit switch should the band be improperly placed on the spindles.

Air pipe 57 is connected to spray guns 25, 26, 27, 28, 29 and 30 through branch connections 60, 61, 62, 63, 64, and 65 and these spray guns are operated in unison. Spray gun 41 is operated independently, and for this purpose a flexible air hose 66 connects it to a suitable source such as the air pressure line 67. It has a valve 68 on the gun whereby it may be operated at will.

The coating dispersion is mixed in a tank 69 provided with a vertical shaft 70 driven by a belt 71 which engages a pulley 72 fixed to the shaft. Stirring paddles 73, 74 are fixed to shaft 70. A valve 75 at the bottom of the tank connects with a delivery pipe 76 whereby the mixed material may be drawn off and transferred to the tank 31 as needed.

The operation of the apparatus is as follows: A supply of coating material is drawn from the mixer 69 to the tank 31. The agitators 32, pump 31, and spindles 23, 24 are driven constantly. The operator places a tire band 22 about the spindles 23, 24 as shown in Fig. 2. The band contacts the roller 52 and moves rod 53 to close limit switch 54 which starts the timing switch 54a. This in turn opens valve 55 for a limited period of time during which the spray guns 25, 26, 27, 28, 29 and 30 direct a spray of coating material against the inside and outside of the band. Additional coating as desired may be applied by means of the hand gun 41. When the tire band is relatively small, it may be placed above the spindles as is indicated at 22a. The coating material is continuously agitated and circulated in all the tanks and through all the conduits and past all of the spray guns and is kept at a highly uniform consistency without objectionable sedimentation such as to cause clogging of parts. The use of trick dispersions is made possible so that moisture is kept low, and the uniformity of the dispersion permitted makes for economy of material and more satisfactory tire band lubrication. When the amount of moisture is kept low, the coating material may be applied and dried before the moisture has a chance to penetrate into the fabric and cord material of the band, thereby avoiding the need for extensive drying.

Variations may be made without departing from the scope of the invention as it is defined by the following claims.

I claim:

1. Apparatus for coating a tire article of annular form, said apparatus comprising a spindle for supporting the article, means for driving the spindle to rotate the article, tapered means on the spindle for urging the article along the same to a coating position, means for supplying a dispersion of the coating material, means for spraying the dispersion upon the article and means operable upon the arrival of said article in said coating position for starting operation of the spraying means.

2. Apparatus for coating a tire article of annular form, said apparatus comprising a spindle for supporting the article, means for driving the spindle to rotate the article, tapered means on the spindle for urging the article along the same to a coating position, means for supplying a dispersion of the coating material, means for spraying the dipersion upon the article, timing means for controlling the duration of the spray against the article, and means operable upon the arrival of said article in said coating position for starting said timing means.

3. Apparatus for coating a tire article of anular form, said apparatus comprising a plurality of spindles providing a cradle for supporting the article, means for driving the spindles to rotate the article, tapered means on the spindles for urging the article along the same to a coating position, means for supplying a dispersion of the coating material, means for spraying the dispersion upon the article, timing means for controlling the duration of the spray against the article, and means operable upon arrival of said article in said coating position for starting the timing means.

4. Apparatus for coating an unvulcanized annular tire article with heavy pulverulent material which comprises a rotatable spindle of small diameter as compared to the inner diameter of the tire article for frictionally engaging an internal surface of the tire article to rotate it about its axis, means for rotating the spindle, a supply of the pulverulent material suspended in a liquid, means for continuously stirring the liquid-dispersed supply, spraying mechanism associated with said supply, and means for circulating the liquid-dispersed material from said supply past said spraying mechanism, said spraying mechanism being arranged to direct a spray of the liquid-dispersed material from said spraying mechanism against a tire article upon said spindle.

5. Apparatus for coating an unvulcanized annular tire article with heavy pulverulent material which comprises a rotatable spindle for frictionally engaging a surface of the tire article to rotate it about its axis, means for roating the spindle, a supply of the pulverulent material suspended in a liquid, means for continuously stirring the liquid-dispersed supply, a spraying mechanism at the spindle, means for continuously circulating the liquid-dispersed material from said supply past said spraying mechanism, and means responsive to the presence of a tire article on said spindle for operating said spraying mechanism to deliver a spray of the liquid-dispersed material against said article.

6. Apparatus for coating an unvulcanized annular tire article with heavy pulverulent material which comprises a freely extending rotatable spindle of relatively small diameter as compared to the interior of the tire article for frictionally engaging the inner surface of the article to rotate it about its axis while exposing both the interior and exterior of the article, means for supporting and rotating the spindle, a supply of the pulverulent material suspended in a liquid, means for continuously stirring the liquid-dispersed supply, a spraying mechanism at said spindle directed toward the inner and outer surfaces of the article, means for continuously circulating the liquid-dispersed material from said supply past said spraying mechanism, and means for operating said spraying mechanism to deliver a spray of the liquid-dispersed material against the exterior and interior of said article.

7. Apparatus for coating an unvulcanized annular tire article with heavy pulverulent material which comprises a pair of freely extending parallel rotatable spindles arranged to extend within the tire article for frictionally engaging its inner surface to rotate the tire about its axis, means for supporting and rotating said spindles, a supply of the pulverulent material suspended in a liquid, means for continuously stirring the liquid-dispersed supply, a spraying mechanism directed toward the tire article, means for continuously circulating the liquid-dispersed material from said supply past said spraying mechanism, and means responsive to the presence of a tire article on said spindles for operating said spraying mechanism to deliver a spray of the liquid-dispersed material against said article.

CHARLES W. LEGUILLON.

CERTIFICATE OF CORRECTION.

Patent No. 2,355,382. August 8, 1944.

CHARLES W. LEGUILLON.

It is hereby certified that error appears in the printed specification of the above numbered patent requiring correction as follows: Page 2, second column, line 28, for the word "trick" read --thick--; line 60, claim 2, for "dipersion" read --dispersion--; and that the said Letters Patent should be read with this correction therein that the same may conform to the record of the case in the Patent Office.

Signed and sealed this 19th day of December, A. D. 1944.

Leslie Frazer

(Seal) Acting Commissioner of Patents.